(No Model.)

E. E. KOEHLER.
CARD GAME.

No. 422,807.　　　　　　　　　　　　　Patented Mar. 4, 1890.

Fig. 2.

|  | Topic Card B | 1 C | 2 | 3 | 4 | 5 C |
|---|---|---|---|---|---|---|
| I | PUBLICATIONS | St Nicholas / I-XX | Judge / I-XV | Chatterbox C / I-XX | Wide-awake / I-VI-XX | Mercury C / I-IV-XIII-XIX |
| II | COINS | Guinea / II-VIII-XXI | Eagle C / II-VII-VIII-XIII | Nickel / I-XX | Napoleon C / II-XXIII- | Crown / II-VIII |
| III | FLOWERS | Narcissus C / III-IV | Adonis / III-IV | Lady's Slipper C / III-VI | Lady Washington / III-XXVIII | Amaranth / III-VIII-XI |
| IV | MYTHOLOGICAL | Unicorn / IV-VIII | Paris C / IV-XXV-XXVI | Neptune / IV-XIII | Juno C / IV-XIII | Nectar / IV-XII |
| V | LAND CONVEYANCES | Fly C / V-VIII | Cutter / V-XVI-XVIII | Surrey C / V-XXI | Berlin / V-XXV-XXVI | Phaeton / V-IV-VIII |
| VI | WEARING APPAREL | Mackintosh C / VI-XXIII-XXIV | Bishop / VI-XII-XV | Boa / VI-VIII | Ulster C / VI-XXI | Moccasin / VI-III-VIII |

Fig. 1.

A

I PUBLICATIONS
II COINS
III FLOWERS
IV MYTHOLOGICAL
V LAND CONVEYANCES
VI WEARING APPAREL
VII EMBLEMS
VIII ANIMALS
IX TREES AND SHRUBS
X CLOTHS
XI COLORS
XII LIQUIDS
XIII ASTRONOMICAL
XIV RIVERS
XV TITLES OF RULERS
XVI UTENSILS
XVII GAMES
XVIII A FLEET
XIX MINERALS AND METALS
XX NURSERY FRIENDS
XXI COUNTRIES, COUNTIES, PROVINCES, Their Poetical or Common Names
XXII MONARCHIES, Their Poetical or Common Names
XXIII EMINENT MEN, Their Sobriquets or Proper Names
XXIV WRITERS
XXV CITIES, Their Poetical or Common Names
XXVI CAPITALS, Their Poetical or Common Names
XXVII FAMOUS WOMEN, Their Pseudonyms or Proper Names
XXVIII WARE Attest:
Sidney P. Hollingsworth
Horace A. Dodge Inventor:
Emma E. Koehler,
by Dodger Sons,
Attys.

UNITED STATES PATENT OFFICE.

EMMA E. KOEHLER, OF TOLEDO, OHIO.

CARD GAME.

SPECIFICATION forming part of Letters Patent No. 422,807, dated March 4, 1890.

Application filed October 16, 1889. Serial No. 327,164. (No model.)

*To all whom it may concern:*

Be it known that I, EMMA E. KOEHLER, a citizen of the United States, residing at Toledo, in the county of Lucas and State of Ohio, have invented certain new and useful Improvements in Card Games, of which the following is a specification.

My invention relates to games to be played with cards; and it consists in a pack or deck composed of a series of topic-cards and a series of relative cards, or cards pertaining to the different topics, a like number to each, some or all of the relative-cards being susceptible of being played under either or any of two or more topics, but having the same value in all cases.

In practice the number of topics and the number of relative cards under each topic may vary as found desirable. For the purposes of illustration I shall describe the pack as composed of twenty-eight topic-cards and five relative cards under each topic, making twenty-eight "books" of six cards each, including the topic-cards. The choice of topics may be made from an unlimited field, and will depend somewhat upon the contemplated ages of the players and upon the object with which the game is played. Thus, for comparatively young children, topics may be selected from subjects or fields with which they may reasonably be expected to be familiar, while for older players more advanced topics may be selected. This is mentioned, however, as one of the possibilities of the game rather than as an essential feature. So, too, the number of relative cards that shall be required to make up a book may be varied by agreement at the commencement of the play.

In the drawings annexed, Figure 1 shows a card, leaf, or tablet bearing the list of topics, and Fig. 2 represents on a reduced scale a group of cards sufficient to illustrate the principle of the game.

In said drawings, A indicates a card, leaf, or tablet bearing a complete list of topics under the representative or illustrative game of twenty-eight topics above proposed, and for convenience of reference these topics are numbered consecutively, Roman numerals being employed to prevent confusion with the numerals of the relative cards.

B indicates a topic-card, which will advisably be printed in different color from the relative cards, or in different type, or otherwise made readily distinguishable therefrom, so that the players may more quickly pick them from among the cards in their hands. Six such topic cards are shown.

C indicates a relative card, of which six sets are shown, but of which there will in practice be as many sets as there are topics.

The topics adopted for the present explanation are the following: I, publications; II, coins; III, flowers; IV, mythological; V, land-conveyances; VI, wearing-apparel; VII, emblems; VIII, animals; IX, trees and shrubs; X, cloths; XI, colors; XII, liquids; XIII, astronomical; XIV, rivers; XV, titles of rulers; XVI, utensils; XVII, games; XVIII, a fleet; XIX, minerals and metals; XX, nursery friends; XXI, political divisions, their common or fanciful names; XXII, monarchies, their common or fanciful names; XXIII, eminent men, their proper names or sobriquets; XXIV, writers; XXV, cities, their common or fanciful names; XXVI, capitals, their common or fanciful names; XXVII, wares; XXVIII, famous women, their proper names or pseudonyms.

Taking the first six topics, their relative cards, or the complete books, are as follows:

I.

| Publications. | Topic-card. |
|---|---|
| 1. St. Nicholas | I XX. |
| 2. Judge | I XV. |
| 3. Chatterbox | I XX. |
| 4. Wide-Awake | I VI XX. |
| 5. Mercury | I XIX IV XIII. |

II.

| Coins. | Topic-card. |
|---|---|
| 1. Guinea | II VIII XXI. |
| 2. Eagle | II VII VIII XIII. |
| 3. Nickel | II XIX. |
| 4. Napoleon | II XXIII XXV. |
| 5. Crown | II VII. |

III.

| Flowers. | Topic-card. |
|---|---|
| 1. Narcissus | III IV. |
| 2. Adonis | III IV. |
| 3. Lady's Slipper | III VI. |
| 4. Lady Washington | III XXVIII. |
| 5. Amaranth | III VII XI. |

IV.
| Mythological. | Topic-card. |
|---|---|
| 1. Unicorn | IV VIII. |
| 2. Paris | IV XXV XXVI. |
| 3. Neptune | IV XIII. |
| 4. Juno | IV XIII. |
| 5. Nectar | IV XII. |

V.
| Land-conveyances. | Topic-card. |
|---|---|
| 1. Fly | V VIII. |
| 2. Cutter | V XVI XVIII. |
| 3. Surrey | V XXI. |
| 4. Berlin | V XXV XXVI. |
| 5. Phaeton | V IV VIII. |

VI.
| Wearing-apparel. | Topic-card. |
|---|---|
| 1. Mackintosh | VI XXIII XXIV. |
| 2. Bishop | VI XII XV. |
| 3. Boa | VI VIII. |
| 4. Ulster | VI XXI. |
| 5. Moccasin | VI VIII III. |

Following the title or word borne by each of the cards in the foregoing list are Roman numerals indicating different topics under or different books in which each of said cards may be played. These numerals are not printed upon the cards, and are given in the list merely for convenience of explanation.

It will be understood that it is not essential that all the cards be susceptible of being played under two or more topics, and, in fact, it is not desirable that all should be so, because more variety and amusement are secured when the cards vary in this particular, some being in such case easy to make use of and others difficult to play, as will be better appreciated upon describing the manner of playing the game.

Before beginning the play, it is agreed that a certain number of relative cards, together with the topic-card, shall constitute a book, one or more of each set being preferably omitted to give variety to the game and to produce uncertainty as to which of two or more books a player shall endeavor to complete first. All may be used, however, if preferred. This arranged, the cards are dealt around, a prearranged number to each player, and the remaining cards are placed upon the table, and constitute a bank or pack from which the players may draw upon certain conditions.

The first player begins by laying down a topic-card, or, if he have none, he draws from the pack or bank. If he fails to draw a topic-card, the next player lays a topic-card or draws from the pack, and so on until a topic-card is laid upon the table. After a topic-card is thus laid, the next player in order, if he have a relative card pertaining to that topic, or one which, though not belonging strictly to that book, is fairly comprehended under such topic or applicable thereto, lays such card beside the topic-card. If he have no relative card that may fairly be played to the topic-card upon the table, he may play another topic-card, or, having neither, he may draw, and, if successful in obtaining either a topic-card or a relative card applicable to the topic-card already played, he places it upon the table. If unsuccessful, the next player proceeds in the same manner.

Each player may play to any topic-card to which his relative cards apply, and where a relative card can be played under different topics he may elect as to where it shall be played.

Assuming now that topic-cards "Coins," "Emblems," "Animals," and "Astronomical," topics II VII VIII XIII, are lying upon the table, and a player holds relative cards "Eagle" (book 2, card 2) and "Neptune" (book 4, card 3) he may play the card "Eagle" with any one of the four topic-cards, although it strictly belongs to book No. 2, or relates primarily to topic-card II. The term "Eagle" in other words is the name of a coin, and it is also the name of an emblem, of an animal, and of a constellation. The relative card "Neptune" belongs strictly to the topic IV, "Mythological," and consequently to book No. 4; but being also the name of a star, it may be played under the topic XIII, "Astronomical." The cards being thus interchangeable, and having a fixed value in whatever book they be played, are apt to be played wherever an opportunity offers, and as a consequence it will frequently happen that some book which is started cannot be completed because some of its cards have been played to other topics, and those remaining unplayed are not applicable to such book. The player who places the last relative card of the prearranged number opposite the topic-card of a book takes the book, and the object sought is to secure as large a number of books as possible, the player holding the largest number being the winner of the game.

The rules and regulations of the game may be considerably varied in different particulars; but the foregoing is sufficient to show the general plan or principle.

In its outlines the game is analogous to "Authors" and other games of that class; but so far as I am aware the feature of interchangeability or the capability of the cards to be played at will under different topics with uniform value in each is a feature not heretofore introduced into any game of this character. This peculiarity of the game adds greatly to its interest and is quite instructive, in that it causes the players to search out and familiarize themselves with the different and varied meanings of the words employed.

Having thus described my invention, what I claim is—

1. A pack of cards divided into groups or books, each book consisting of a topic-card, and a series of relative cards bearing a word or words relating to the topic of that book, some or all of the relative cards of a book being applicable also to another topic.

2. A pack of cards consisting of a series of topic-cards and groups of relative cards, those of each group pertaining to the topic of such group, and some of the relative cards being applicable to several topics.

3. A pack of cards consisting of topic-cards and relative cards, each referring primarily to a particular topic, some of the relative cards being applicable to two or more topics and having a uniform value wherever played.

In witness whereof I hereunto set my hand in the presence of two witnesses.

EMMA E. KOEHLER.

Witnesses:-
RUFUS H. BABEE,
FRED. D. McCUTCHEON.